United States Patent [19]
Yukimoto et al.

[11] Patent Number: 5,011,900
[45] Date of Patent: Apr. 30, 1991

[54] CURABLE COMPOSITION

[75] Inventors: Sadao Yukimoto; Toshifumi Hirose; Hiroshi Wakabayashi; Katsuhiko Isayama, all of Hyogo, Japan

[73] Assignee: Kanegafuchi Kagaku Kogyo Kabushiki Kaisha, Osaka, Japan

[21] Appl. No.: 362,714

[22] Filed: Jun. 7, 1989

[30] Foreign Application Priority Data

Jun. 10, 1988 [JP] Japan ................... 63-144014

[51] Int. Cl.$^5$ ........................... C08F 283/00
[52] U.S. Cl. ..................... 525/477; 525/403; 525/437; 525/476; 525/479; 528/25; 528/33; 528/34; 528/26; 528/26.5
[58] Field of Search ............ 525/403, 477, 479, 437, 525/476; 528/25, 34, 33, 26, 26.5

[56] References Cited

U.S. PATENT DOCUMENTS 4,463,115  7/1984  Hirose et al. ................ 525/403
4,788,254  11/1988  Kawakubo et al. ............ 528/18
4,902,575  2/1990  Yukimoto et al. ............ 524/366
4,906,707  3/1990  Yukimoto et al. ............ 525/409

FOREIGN PATENT DOCUMENTS 0169536  1/1986  European Pat. Off. .
0242903  10/1987  European Pat. Off. .

OTHER PUBLICATIONS

Patent Abstracts of Japan, vol. 11, No. 229 (C-436) [2676], Jul. 25, 1987; & JP-A-62 39 646 (Kanegafuchi Chem. Ind. Co., Ltd.), 20-02-1987.

Primary Examiner—Melvyn I. Marquis
Attorney, Agent, or Firm—Armstrong, Nikaido, Marmelstein, Kubovcik & Murray

[57] ABSTRACT

A curable composition. The composition comprises (A) 100 parts by weight of an oxyalkylene polymer having at least one silicon-containing group in which a hydroxy group and/or hydrolyzable group is or are bonded to the silicon atom, said polymer being crosslinkable by formation of a siloxane bond, (B) from 0.1 to 20 parts by weight of a compound having one silanol group per molecule and/or a compound capable of forming a compound having one silanol group per molecule on reacting with moisture, and (C) from 0.1 to 20 parts by weight of a compound having an air oxidative curing unsaturated group. The composition provides a cured product which has low modulus and resistance to dust adhesion and on which an alkyd coating shows excellent coating properties.

10 Claims, No Drawings

CURABLE COMPOSITION

FIELD OF THE INVENTION

This invention relates to a curable composition containing an oxyalkylene polymer having a silicon-containing group which has a silicon atom to which a hydroxyl group and/or a hydrolyzable group are bonded, said polymer being crosslinkable through siloxane bond formation.

BACKGROUND OF THE INVENTION

Oxyalkylene polymers containing a silicon-containing group in which hydroxyl groups and/or hydrolyzable groups are bonded to the silicon atom (hereinafter sometimes referred to as a reactive silicon group) and which are thereby capable of crosslinking through siloxane bond formation are disclosed, e.g., in U.S. Pat. No. 3,971,751. Representative of such oxyalkylene polymers is a polymer of the formula:

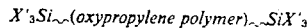

wherein X' represents a hydrolyzable group such as a methoxy group.

Oxyalkylene polymers having a reactive silicon group are cured through formation of a siloxane bond (Si—O—Si) among polymer molecules by the action of moisture in the air and the like at room temperature similar to room temperature curable silicone rubbers to thereby provide a rubbery cured product. The cured product of the oxyalkylene polymer has excellent tensile characteristics, such as large elongation, low modulus and high breaking strength, excellent adhesive properties, and excellent printability on the surface of the cured product and are therefore useful as sealants, adhesives and the like.

While the cured product of the oxyalkylene polymer having a reactive silicon group exhibits superior performance properties as described above, it is often required to have a low modulus when used as a sealant and the like. Although almost all paint can be applied on the surface of the cured product, so-called alkyd paints are hardly dried and cured when applied on the surface the cured oxyalkylene polymer. Moreover, since the surface of the cured product is liable to pick up dust to produce an impaired appearance, it is sometimes unsuitable for use as a sealant or a coating.

The inventors have previously proposed a composition capable of providing a cured product having a low modulus which comprises an oxyalkylene polymer having a reactive silicon group and a compound containing one silanol group per molecule and/or a compound capable of forming a compound having one silanol group per molecule on reacting with moisture (hereinafter inclusively referred to as a monosilanol compound), as disclosed in U.S. Pat. No. 4,788,254 (corresponding to JP-A-61-34066). It was determined, however that the cured product of this composition tends to be inferior to those of compositions containing no such monosilanol compound in terms of paintability of alkyd paints applied to the surface of the cured product and dust resistance.

SUMMARY OF THE INVENTION

One object of this invention is to provide a composition containing an oxyalkylene polymer having a reactive silicon group which provides a cured product having a low modulus on which alkyd paints can be applied.

Another object of this invention is to provide a composition containing an oxyalkylene polymer having a reactive silicon group which provides a cured product having low modulus and also having improved resistance to dust adhesion.

The present invention relates to a curable composition comprising (A) 100 parts by weight of an oxyalkylene polymer having at least one silicon-containing group in which a hydroxyl group and/or a hydrolyzable group is or are bonded to the silicon atom, said polymer being crosslinkable by formation of a siloxane bond, (B) from 0.1 to 20 parts by weight of a compound having one silanol group per molecule and/or a compound capable of forming a compound having one silanol group per molecule on reacting with moisture, and (C) from 0.1 to 20 parts by weight of a compound having an air oxidative curing unsaturated group.

DETAILED DESCRIPTION OF THE INVENTION

The compound containing an air oxidative curing unsaturated group (hereinafter referred to as an unsaturated compound) is a compound which is hardened by a crosslinking or the like reaction with oxygen in air to provide a relatively stiff cured product. Therefore, when a curable composition which provides a cured product of a low modulus is desired, it is unlikely for such an unsaturated compound, which is believed to increase the modulus, to be incorporated into the composition.

Contrary to the expected result, the composition of the present invention containing the unsaturated compound provides a cured product exhibiting improved resistance to dust adhesion as compared with a cured product of a composition not containing the unsaturated compound while substantially retaining a low modulus.

In addition, the cured product of the composition of the invention exhibits the improved properties that alkyd paints applied thereon have satisfactory curability.

The oxyalkylene polymer having at least one reactive silicon group which can be used in the present invention [hereinafter referred to as an oxyalkylene polymer (A)] is a known polymer as disclosed in U.S. Pat. Nos. 3,971,751; 3,979,384; and 4,323,488 and Japanese Patent Publications; JP-B-45-36319, JP-B-46-12154, and JP-B-49-32673) and JP-A-50-156599, JP-A-51-73561, JP-A-54-6069, JP-A-55-82123, JP-A-55-123620, JP-A-55-125121, JP-A-55-131022, JP-A-55-135135, and JP-A-55-137129.

The molecular chain of the oxyalkylene polymer (A) comprises a repeating, or recurring, unit represented by the formula:

wherein $R^1$ represents a substituted or unsubstituted divalent hydrocarbon group having up to 12 carbon atoms. The main chain of the oxyalkylene polymer can consist solely of repeating units of the above formula or can contain other repeating units. In the latter case, the main chain preferably comprises at least 60% by weight, more preferably at least 80% by weight, of the repeating unit of the above formula.

The hydrocarbon group as represented by $R^1$ preferably includes a substituted or unsubstituted divalent alkylene group having from 2 to 5 carbon atoms, and particularly an alkylene group having from 3 to 4 carbon atoms. Specific examples of the alkylene group as $R^1$ are

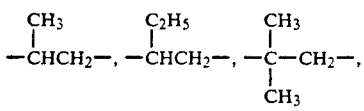

and $-CH_2CH_2CH_2CH_2-$, with

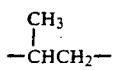

being preferred. The oxyalkylene chain in the polymer (A) may comprise either one or more than one kind of the repeating unit of the formula $-R^1-O-$.

The reactive silicon group in the oxyalkylene polymer (A) is a well-known functional group and is characterized by crosslinkability at room temperature. Typical examples of the reactive silicon group include a group represented by formula (I):

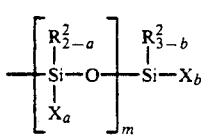

wherein $R^2$ represents a monovalent organic group having from 1 to 40 carbon atoms; when there are more than one $R^2$, they can be the same or different; X represents a hydroxyl group or a hydrolyzable group; when there are more than one X, they can be the same or different; a represents 0, 1 or 2, and b represents 0, 1, 2 or 3, provided that the sum of a and b is one or more; and m represents 0 or an integer of from 1 to 19; when m is 2 or more, a in the moiety

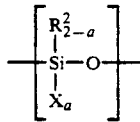

need not be the same.

Of the reactive silicon groups represented by formula (I), preferred is a group represented by formula (II) shown below in view of economy:

wherein $R^2$ is as defined above; and l represents 1, 2 or 3.

Specific examples of the hydrolyzable group as represented by X in the formulae (I) and (II) include a halogen atom, a hydrogen atom, an alkoxyl group, an acyloxy group, a ketoxymate group, an amino group, an amido group, an aminooxy group, a mercapto group, and an alkenyloxy group. An alkoxyl group, e.g., methoxy and ethoxy, is preferred from the standpoint of mild hydrolyzability.

The organic group as represented by $R^2$ includes a substituted or unsubstituted hydrocarbon group and a triorganosiloxy group each having up to 40 carbon atoms.

Typical examples of $R^2$ include an alkyl group, e.g., methyl, ethyl, chloromethyl and chloroethyl; a cycloalkyl group, e.g., cyclohexyl; an aryl group, e.g., phenyl, chlorophenyl and fluorophenyl; an aralkyl group, e.g., benzyl; and a triorganosiloxy group such as trimethoxysiloxy group represented by the formula:

wherein R' represents an organic group having from 1 to 20 carbon atoms and the three R' groups need not be the same.

Particularly preferred as $R^2$ is a methyl group.

The oxyalkylene polymer (A) should contain at least one reactive silicon group as described. It is preferred that the polymer (A) contains at least 1.1, more preferably from 1.5 to 4, reactive silicon groups on the average in order to obtain sufficient curability. The reactive silicon group preferably exists at the molecular chain terminal of the oxyalkylene polymer (A).

The oxyalkylene polymer (A) preferably has a number average molecular weight of from 3,000 to 30,000, more preferably from 5,000 to 15,000. The oxyalkylene polymer (A) can be used either individually or in a combination of two or more thereof.

The oxyalkylene polymer (A) can be prepared through various processes. One example of the processes comprises reacting an oxyalkylene polymer having a certain functional group (designated as Y group) with a compound having a functional group capable of reacting with the Y group (designated as Y' group) and a reactive silicon group to thereby introduce the reactive silicon group into the oxyalkylene polymer.

More specifically, such a process includes the following embodiments.

(1) A process comprising reacting (hydrosilylating) an oxyalkylene polymer having an unsaturated group with a hydrosilane compound having a hydrolyzable group, e.g., $HSi(OCH_3)_3$, in the presence of a Group VIII transition metal compound as a catalyst. This reaction can be illustrated by the following scheme:

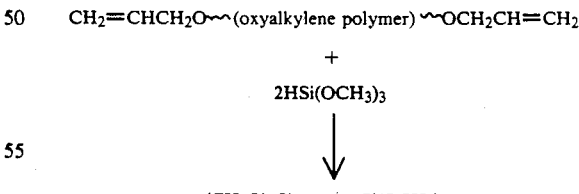

(2) A process comprising addition reaction between an oxyalkylene polymer having an unsaturated group and a compound having a mercapto group and a reactive silicon group, e.g., $HS(CH_2)_3Si(OCH_3)_3$.

(3) A process comprising reacting an oxyalkylene polymer having an isocyanate group with a compound having an active hydrogen and a reactive silicon group, e.g., $H_2N(CH_2)_3Si(OCH_3)_3$. This reaction can be illustrated by the following scheme;

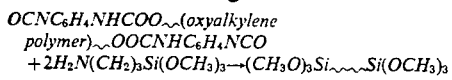

(4) A process comprising reacting an oxyalkylene polymer having a hydroxyl group with a compound having an isocyanate group and a reactive silicon group, e.g., OCN(CH$_2$)$_3$Si(OCH$_3$)$_3$.

Of these processes, the process comprising reacting an oxyalkylene polymer having an unsaturated group with a hydrosilane compound is usually employed. The oxyalkylene polymer having an unsaturated group can be obtained by introducing an unsaturated group into an oxyalkylene polymer having a hydroxyl group utilizing the hydroxyl group as disclosed in JP-A-54-6097.

The oxyalkylene polymer (A) to be used in the present invention is not limited to those obtained by the above-described processes. Polymers obtained by any other process may also be employed. Implicit in the definition of the oxyalkylene polymer (A) are polymers having a modified polymer chain, such as those obtained by polymerizing a polymerizable monomer, e.g., a vinyl monomer, in the presence of an oxyalkylene polymer (A) and those obtained by polymerizing a polymerizable monomer in the presence of an oxyalkylene polymer having a hydroxyl group and then introducing a reactive silicon group into the resulting polymer.

The monosilanol compound to be used in the composition according to the present invention exerts an effect to reduce the modulus of a cured product of the oxyalkylene polymer (A) upon mere addition to the oxyalkylene polymer (A). The monosilanol compounds are easily available.

The compound having one silanol group per molecule, one type of the monosilanol compounds, is not particularly restricted as long as it has one

group in the molecule thereof. Specific examples of such a compound include a compound represented by the formula:

(R$^3$)$_3$SiOH wherein each R$^3$, which may be the same or different, represents a substituted or unsubstituted alkyl or aryl group having up to 20 carbon atoms, such as (CH$_3$)$_3$SiOH, (CH$_3$CH$_2$)$_3$SiOH, (CH$_3$CH$_2$CH$_2$)$_3$SiOH, (C$_6$H$_5$)$_3$SiOH,

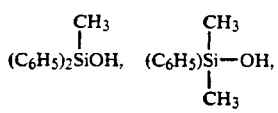

a cyclic polysiloxane compound containing one silanol group, such as

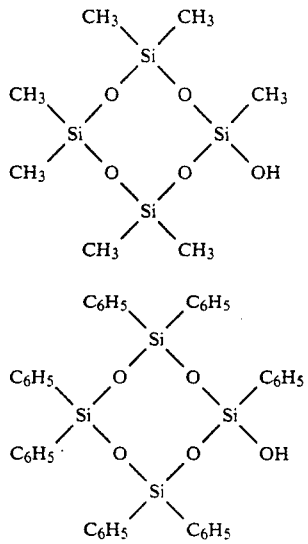

and an acyclic polysiloxane compound containing one silanol group, such as

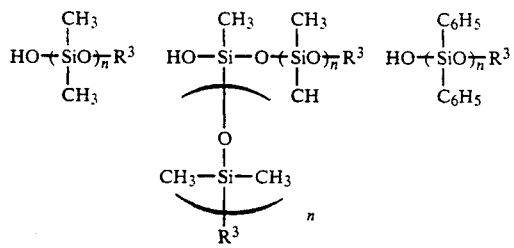

wherein R$^3$ is as defined above; and n represents 0 or an integer of from 1 to 40.

When the amount of the monosilanol compound added is equal, the effect of addition of these monosilanol compounds becomes greater as the

content increases. From this consideration, (CH$_3$)$_3$SiOH and (CH$_3$CH$_2$)$_3$SiOH are preferred. From the viewpoint of ease in handling and stability in air, (C$_6$H$_5$)$_3$SiOH is preferred.

The compound capable of forming a compound having one silanol group in the molecule thereof on reacting with moisture, another type of the monosilanol compounds, includes derivatives of the above-described compounds of formula (R$^3$)$_3$SiOH. Examples of such compounds which can be suitably used are those known as a silylating agent, such as

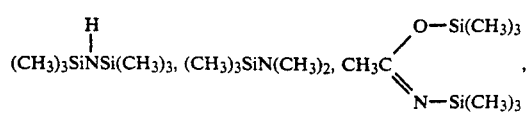

-continued

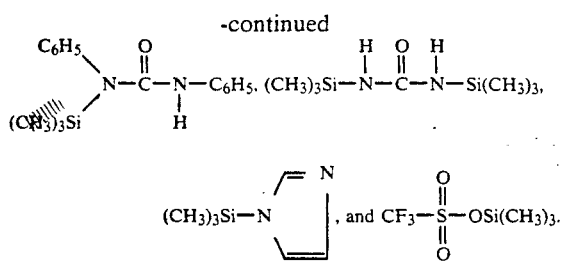

From the standpoint of high

content of the hydrolysis product,

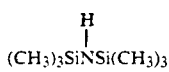

is particularly preferred.

The mechanism of the monosilanol compound in exerting effects to improve tensile properties of a cured product, that is, to reduce the modulus and increase the elongation, may be interpreted as follows. The compound reacts with the reactive silicon group in the oxyalkylene polymer (A) to cap the reactive group. As a result, the number of crosslinking points of the cured polymer is decreased, and the molecular weight between crosslinking points increases, to thereby achieve reduced modulus and increased elongation.

The monosilanol compound is usually added in an amount of from 0.1 to 20 parts by weight, preferably from 0.5 to 10 parts by weight, per 100 parts by weight of the oxyalkylene polymer (A). The amount to be added may be determined on the basis of silanol

equivalents with respect to the reactive silicon group in the oxyalkylene polymer (A). In this case, the silanol equivalent of the monosilanol compound usually amounts to 0.1 to 0.9 times the reactive silicon group. It is desirable to determine the amount of the monosilanol compound so that at least one reactive silicon group may remain uncapped in the molecule of the oxyalkylene polymer (A). Economically considered, use of more than 0.9 equivalent of the silanol group, though possible, has no merit.

The unsaturated compound containing an air oxidative curing unsaturated group per molecule includes drying oils, e.g., tung oil and linseed oil, or various drying oil alkyd resins obtained therefrom; acrylic resins, epoxy resins or silicone resins each modified by drying oils; and 1,2-polybutadiene, 1,4-polybutadiene, homo- or copolymers of dienes having from 5 to 8 carbon atoms, or various modified resins of these polymers (e.g., maleic resins, modified boiled oils). Preferred among them are tung oil and liquid diene polymers or modified products thereof.

Specific examples of the liquid diene polymers are liquid polymers obtained by homo- or copolymerizing diene compounds, e.g., butadiene, chloroprene, isoprene, and 1,3-pentadiene; liquid polymers mainly comprising the diene compound which are obtained by copolymerizing the diene compound and copolymerizable monomers (e.g., acrylonitrile, styrene), such as NBR and SBR; and various modified products of these polymers (e.g., maleic resins, modified boiled oils). Preferred are liquid polybutadienes, with liquid 1,2-polybutadiene being more preferred.

These unsaturated compounds may be used either individually or in a combination of two or more thereof.

The unsaturated compound is preferably used in an amount of from 0.1 to 20 parts by weight, more preferably from 1 to 10 parts by weight, per 100 parts by weight of the oxyalkylene polymer (A). If the amount of this component is less than 0.1 part, improvements in resistance to dust adhesion and drying properties of alkyd paints are not sufficiently achieved. Amounts exceeding 20 parts tend to impair tensile characteristics of the cured product.

If desired, the composition of the present invention may further contain a curing accelerator, a plasticizer, a filler, and other additives.

The curing accelerator which can be used in this invention includes organotin compounds, acid phosphoric esters, reaction products between acid phosphoric esters and amines, saturated or unsaturated polycarboxylic acids or anhydrides thereof, and organic titanate compounds.

Specific examples of the organotin compound are dibutyltin dilaurate, dioctyltin dimaleate, dibutyltin phthalate, tin caprylate, and dibutyltin methoxide.

The acid phosphoric esters are phosphoric esters containing a moiety of

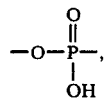

including, for example, organic acid phosphates represented by the formula:

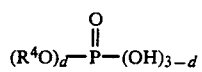

wherein d represents 1 or 2; and $R^4$ represents an organic group.

Specific examples of the acid phosphates are shown below.

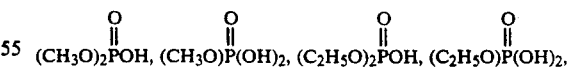

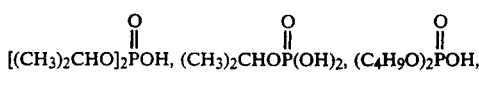

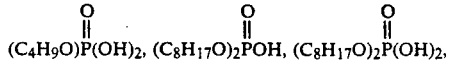

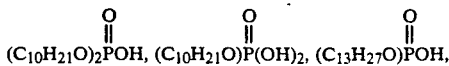

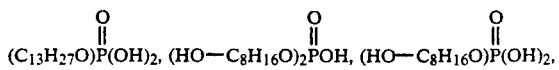

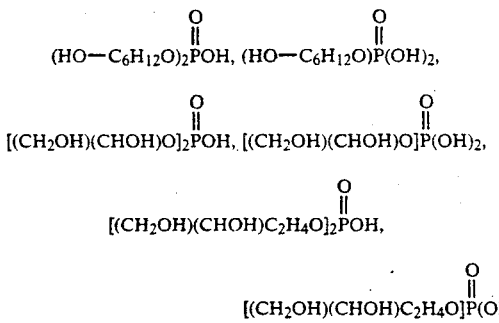

The organic titanate compounds include titanic acid esters, e.g., tetrabutyl titanate, tetraisopropyl titanate, and triethanolamine titanate.

The curing accelerator is preferably used in an amount of from 0.1 to 10 parts by weight per 100 parts by weight of the oxyalkylene polymer (A).

The plasticizer which can be used in this invention includes commonly employed low-molecular weight plasticizers, e.g., dioctyl phthalate, high-molecular weight plasticizers, and high-viscosity plasticizers. The high-molecular weight or high-viscosity plasticizers are more effective than the low-molecular weight plasticizers in improving drying properties of alkyd paints applied on the cured product.

Specific examples of the low-molecular weight plasticizers are phthalic esters, e.g., dibutyl phthalate, diheptyl phthalate, di(2-ethylhexyl) phthalate, butylbenzyl phthalate, and butylphthalylbutyl glycolate; non-aromatic dibasic acid esters, e.g., dioctyl adipate and dioctyl sebacate; and phosphoric esters, e.g., tricresyl phosphate and tributyl phosphate.

The high-molecular weight plasticizer preferably has a molecular weight of from 500 to 15,000, more preferably from 750 to 12,500, and most preferably from 1,000 to 10,000. Specific but non-limiting examples of the high-molecular weight plasticizer are polyester type plasticizers such as polyesters obtained by reaction between dibasic acids and dihydric alcohols; polyethers such as polypropylene glycol or derivatives thereof; polystyrenes such as poly-α-methylstyrene and polystyrene; polydienes such as polybutadiene, butadiene-acrylonitrile copolymers, polychloroprene, and polyisoprene; and polyolefins such as polybutene and hydrogenated polybutene. Preferred are polyester type plasticizers, polyethers, polystyrenes, polybutadiene, and polybutene. In particular, the polyethers are superior plasticizers in view of their good compatibility with the oxyalkylene polymer (A), viscosity-reducing properties, excellent workability, and effect in bringing about decreased modulus and increased elongation of the cured product, as well as the effect in improving drying properties of alkyd paints.

The polyethers as plasticizer preferably have a number average molecular weight of at least 4,500, more preferably between 5,000 and 10,000. Further, polyethers having a small number of molecular terminals or a small number of hydroxyl groups in the molecular terminals are preferred for improving drying properties of applied alkyd paints. Those having substantially no hydroxyl group in the molecular terminals are more preferred. The hydroxyl group at the terminals can be converted to an alkyl ether group, an allyl ether group, or an aryl ether group. Furthermore, those containing not more than 10%, particularly not more than 5% (as calculated according to GPC method) of a component having a number average molecular weight of 1,000 or less are preferred from the standpoint of improvement of drying properties of applied alkyd paints. Furthermore, polyethers having a narrow molecular weight distribution, i.e., a small ratio of weight average molecular weight ($\overline{M}w$) to number average molecular weight ($\overline{M}n$), are preferred for obtaining improved drying properties of applied alkyd paints. In this connection, those having an $\overline{M}w/\overline{M}n$ ratio of not more than 2, particularly not more than 1.6, are preferred.

Specific but non-limiting examples of such preferred polyethers are polyoxypropylene glycol having a number average molecular weight of 4000 or more and having a narrow molecular weight distribution or a small proportion of a component whose molecular weight is 1,000 or less; and the above-described polyoxypropylene glycol in which one, preferably both, of the hydroxyl terminals is (are) blocked by an alkyl ether bond, an alkyl phenyl ether bond, an alkenyl ether bond, an allyl ether bond, etc. or blocked by an alkyl group, an aryl group, an alkenyl group, etc. through a urethane bond, an ester bond, a urea bond, an amide bond, a carbonate bond, etc.

The high-viscosity plasticizers are not limited in molecular weight as long as they have a viscosity of about 8 poise or more, preferably between about 20 and 300 poise, at 25° C. In general, since the viscosity increases as the molecular weight increases, many of the high-molecular weight plasticizers are high-viscosity plasticizers.

Specific but non-limiting examples of the high-viscosity plasticizers other than those enumerated with respect to the high-molecular weight plasticizers include triaryldiethanes and isomeric mixtures thereof, 1-phenyl-1-xylylethane, and chlorinated paraffin. Preferred are triaryldiethanes and isomeric mixtures thereof.

The above-described plasticizers may be used either individually or in a combination of two or more thereof. These plasticizers may be incorporated into the oxyalkylene polymer (A) in the course of its preparation as, for example, a solvent.

In case of using a plasticizer, it is preferably added in an amount of from 1 to 150 parts, more preferably from 10 to 120 parts, most preferably from 20 to 100 parts, by weight per 100 parts by weight of the oxyalkylene polymer (A).

The filler which can be used in the composition includes heavy calcium carbonate, light calcium carbonate, precipitated calcium carbonate, kaolin, talc, silica, titanium oxide, aluminum silicate, magnesium oxide, zinc oxide, and carbon black.

The filler is preferably used in an amount of from 10 to 300 parts by weight per 100 parts by weight of the oxyalkylene polymer (A).

Other additives which can be used in the composition of the present invention include antisagging agents (thickening agents), e.g., hydrogenated castor oil and organic bentonite, colorants, antioxidants, and adhesion-imparting agents.

The composition according to the present invention are useful as sealing compounds, mold materials, casting rubber materials, foaming materials, adhesives, coatings, waterproofing agents and the like.

For example, for use as a construction sealant, the composition of the invention is compounded with 10 to 300 parts by weight of inorganic fillers, e.g., calcium carbonate, talc, and kaolin, per 100 parts by weight of the oxyalkylene polymer (A) and, if desired, pigments, e.g., titanium oxide and carbon black, and anti-aging agents such as ultraviolet absorbents and radical chain terminators, and the composition is uniformly and thoroughly kneaded in a kneader, a paint roller, etc. The resulting composition is applied and cured by exposure to moisture in air to obtain an elastomeric body having satisfactory performance properties.

The present invention is now illustrated in greater detail by way of the following Synthesis Example and Examples, but it should be understood that the present invention is not deemed to be limited thereto.

SYNTHESIS EXAMPLE

In a pressure-resistant reaction vessel was charged 800 g of a polyoxypropylene polymer having an average molecular weight of about 8,000 having an allyl ether group introduced into 97% of the total terminals thereof, and 19 g of methyldimethoxysilane was added thereto. To the mixture was added 0.34 ml of a solution of chloroplatinic acid catalyst (8.9 g of $H_2PtCl_6 \cdot 6H_2O$ dissolved in 18 ml of isopropyl alcohol and 160 ml of tetrahydrofuran), followed by reaction at 80° C. for 6 hours.

It was revealed as a result of IR spectroscopic analysis that virtually no hydrogenated silicon groups remained in the reaction mixture. The reactive silicon group was determined by NMR method. As a result, the resulting oxypropylene polymer was found to contain about 1.7

groups per molecule.

EXAMPLES 1 TO 8 AND COMPARATIVE EXAMPLES 1 TO 2

To 100 g of the polymer as synthesized in Synthesis Example were added 120 g of calcium carbonate ("CCR" produced by Shiraishi Kogyo K.K.) as a filler, 20 g of titanium dioxide ("R 820" produced by Ishihara Sangyo Kaisha, Ltd.), 2 g of aminosilane ("KBM 602" produced by Shin-etsu Chemical Industry Co., Ltd.) as an adhesion-imparting agent, 2 g of dibutyltin diacetylacetonate ("U-220" produced by Nitto Kasei K.K.) as a curing accelerator, 50 g of each of the plasticizers shown in Tables 1, 2 g of the monosilanol compounds shown in Table 1, and 5 g of each of the unsaturated compounds shown in Table 1. The composition was thoroughly mixed and kneaded in a three-roll mill to prepare a 3 mm thick sheet.

The resulting sheet was cured at 23° C. for 1 day. EAch of alkyd paints "Rubbol AZ" (produced by Sikkens Co., The Netherlands) and "Rockcoat" (produced by Rock Paint Co.) was separately coated on the surface of the cured product and aged at 23° C. for a period of time shown in Table 1, and the drying properties of the paint applied were evaluated according to the following rating system:

5 ... The applied paint was completely dried.
4 ... The applied paint was dried, but the surface of the coating remained slightly tacky to the touch.
3 ... The surface of the coating slightly stuck to fingers on touching.
2 ... The applied paint, though partly cured, stuck to fingers on touching.
1 ... The applied paint thickened.
0 ... The applied paint underwent no change (remained undried).

For comparison, the same evaluation was made except for using compositions containing no unsaturated compound. The results obtained are shown in Table 1.

Then, after aging the sheet as above obtained at 23° C. for 1 day, the sheet was subjected to exposure outdoors (at an incline of 45° to the south), and adhesion of dust was observed and evaluated according to the following rating system:

A ... Substantially no dust adhered.
B ... Dust slightly adhered.
C ... Dust considerably adhered.

For comparison, the same evaluation was made except for using compositions containing no unsaturated compound. The results obtained are shown in Table 1.

Further, H-type tensile characteristics of the cured product on a glass substrate were determined according to JIS A5758. The results obtained are shown in Table 1.

TABLE 1

| Example No. | Plasticizer | Monosilanol Compound | Unsaturated Compound | Rubbol AZ 1 day | 3 days | 7 days | Rockcoat 1 day | 3 days | 7 days | $M_{100}^1$ (kg/cm²) | $T_B^2$ (kg/cm²) | $E_B^3$ (%) | Resistance to Dust Adhesion After 1 Mn. | After 2 Mns. |
|---|---|---|---|---|---|---|---|---|---|---|---|---|---|---|
| Example 1 | poly ether[4] | hexamethyl disilazane | linseed oil | 2 | 3 | 3 | 2 | 4 | 4 | 3.1 | 8.2 | 460 | A | B |
| Example 2 | poly ether[4] | hexamethyl disilazane | liquid 1,4-polybutadiene | 4 | 4 | 5 | 4 | 5 | 5 | 2.9 | 8.4 | 420 | A | A |
| Example 3 | poly ether[4] | hexamethyl disilazane | liquid 1,2-polybutadiene | 4 | 5 | 5 | 4 | 5 | 5 | 3.0 | 8.2 | 400 | A | A |
| Example 4 | poly ether[4] | hexamethyl disilazane | tung oil | 4 | 5 | 5 | 4 | 5 | 5 | 3.1 | 8.2 | 430 | A | B |
| Example 5 | DOP[5] | hexamethyl disilazane | linseed oil | 0 | 0 | 2 | 0 | 1 | 3 | 2.9 | 8.4 | 440 | A | B |
| Example 6 | " | hexamethyl disilazane | liquid 1,4-polybutadiene | 0 | 1 | 3 | 0 | 2 | 3 | 2.8 | 7.9 | 450 | A | A |
| Example 7 | " | hexamethyl disilazane | liquid 1,2-polybutadiene | 0 | 1 | 2 | 0 | 1 | 3 | 2.8 | 7.8 | 430 | A | A |
| Example 8 | " | hexamethyl | tung oil | 0 | 1 | 3 | 0 | 2 | 3 | 3.0 | 8.1 | 460 | A | B |

TABLE 1-continued

| Example No. | Plasticizer | Monosilanol Compound | Unsaturated Compound | Rubbol AZ 1 day | 3 days | 7 days | Rockcoat 1 day | 3 days | 7 days | H-Type Tensile Characteristics $M_{100}^1$ (kg/cm$^2$) | $T_B^2$ (kg/cm$^2$) | $E_B^3$ (%) | Resistance to Dust Adhesion After 1 Mn. | After 2 Mns. |
|---|---|---|---|---|---|---|---|---|---|---|---|---|---|---|
| Comparative Example 1 | polyether | disilazane hexamethyl disilazane | — | 1 | 2 | 3 | 2 | 3 | 3 | 3.2 | 8.1 | 442 | B | C |
| Comparative Example 2 | DOP | hexamethyl disilazane | — | 0 | 0 | 0 | 0 | 0 | 0 | 3.0 | 7.9 | 440 | B-C | C |

Note:
[1] Modulus of elasticity at 100% elongation (100% modulus)
[2] Tensile strength at break
[3] Elongation at break
[4] Hydroxypropylene polymer terminated with an allyl ether group at both ends; $\overline{M_n}$ = 5200; $\overline{M_w}/\overline{M_n}$ = 1.6
[5] Di(2-ethylhexyl) phthalate (Mw = 391; made by Daihacki Kagaku K.K.)

While the invention has been described in detail and with reference to specific embodiments thereof, it will be apparent to one skilled in the art that various changes and modifications can be made therein without departing from the spirit and scope thereof.

What is claimed is:

1. A curable composition comprising (A) 100 parts by weight of an oxyalkylene polymer having at least one silicon-containing group in which a hydroxyl group and/or hydrolyzable group is or are bonded to the silicon atom, said polymer being crosslinkable by formation of a siloxane bond, (B) from 0.1 to 20 parts by weight of a compound having one silanol group per molecule and/or a compound capable of forming a compound having one silanol group per molecule on reacting with moisture, and (C) from 0.1 to 20 parts by weight of a compound having an air oxidative curing unsaturated group.

2. A curable composition as claimed in claim 1, wherein said oxyalkylene polymer has a recurring unit represented by formula:

wherein $R^1$ represents a divalent hydrocarbon group having from 1 to 12 carbon atoms.

3. A curable composition as claimed in claim 1, wherein said silicon-containing group is represented by formula (I):

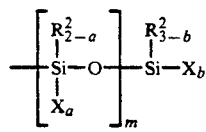
(I)

wherein $R^2$ represents a substituted or unsubstituted monovalent organic group having from 1 to 40 carbon atoms; when there are more than one $R^2$, they may be the same or different; X represents a hydroxyl group or a hydrolyzable group; when there are more than one X, they may be the same or different; a represents 0, 1 or 2, and b represents 0, 1, 2 or 3, provided that the sum of a and b is one or more; and m represents 0 or an integer of from 1 to 19, provided that when m is 2 or more, the value of a in each moiety represented by the formula

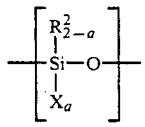

may be the same or different.

4. A curable composition as claimed in claim 3, wherein X is selected from the group consisting of a hydrogen atom, a halogen atom, a hydroxyl group, an alkoxyl group, an acyloxy group, a ketoxymate group, an amino group, an amido group, an aminooxy group, a mercapto group, and an alkenyloxy group.

5. A curable composition as claimed in claim 3, wherein X is an alkoxyl group.

6. A curable composition as claimed in claim 3, wherein X is a methoxy group.

7. A curable composition as claimed in claim 1, wherein said compound having one silanol group per molecule is represented by the formula:

wherein each $R^3$, which may be the same or different, represents a substituted or unsubstituted alkyl or aryl group having up to 20 carbon atoms.

8. A curable composition as claimed in claim 1, wherein said compound capable of forming a compound having one silanol group per molecule is a compound which reacts with moisture to give a product represented by the formula:

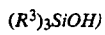

wherein each $R^3$, which may be the same or different, represents a substituted or unsubstituted alkyl or aryl group having up to 20 carbon atoms.

9. A curable composition as claimed in claim 1, wherein said compound having an air oxidative curing unsaturated group is liquid diene compound.

10. A curable composition as claimed in claim 9, wherein said liquid diene compound is liquid 1,2-polybutadiene.

* * * * *